Sept. 25, 1951 W. E. HUNT 2,569,061
CONSTANT SPEED TILTING HELICOPTER ROTOR HEAD
Filed Nov. 15, 1946 3 Sheets-Sheet 1

WILLIAM E. HUNT
INVENTOR

BY Charles L. Shelton

ATTORNEY

WILLIAM E. HUNT
INVENTOR

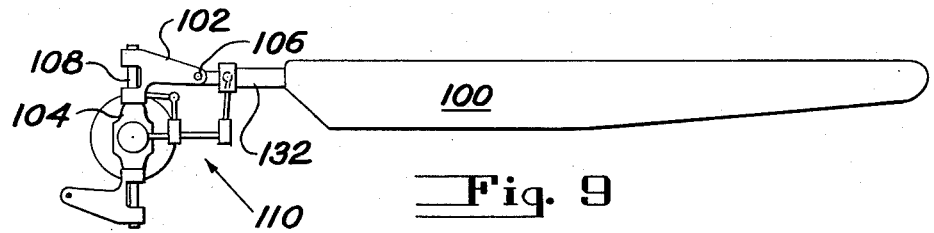
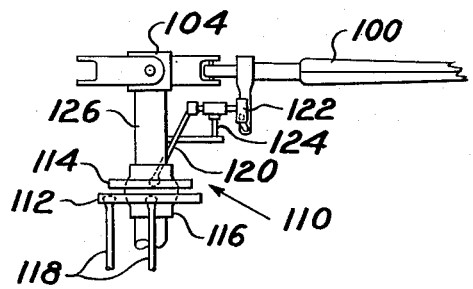
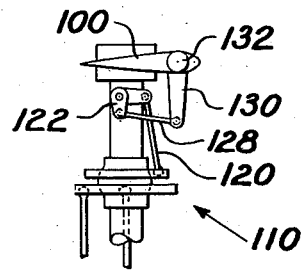
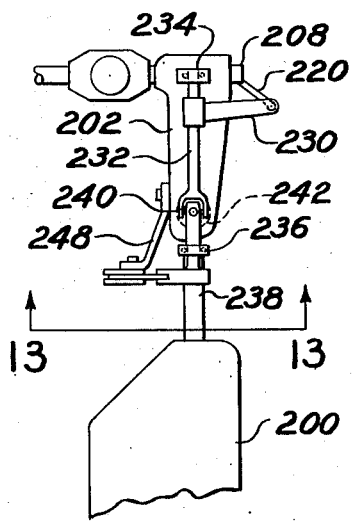
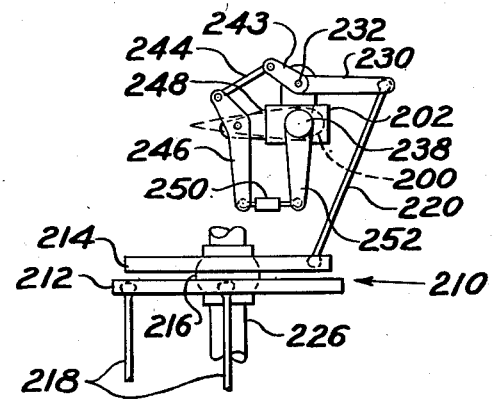

Patented Sept. 25, 1951

2,569,061

UNITED STATES PATENT OFFICE 2,569,061

CONSTANT SPEED TILTING HELICOPTER ROTOR HEAD

William E. Hunt, Brooklyn, N. Y., assignor to United Aircraft Corporation, East Hartford, Conn., a corporation of Delaware Application November 15, 1946, Serial No. 709,978

4 Claims. (Cl. 170—160.25)

This invention relates generally to improved controls for helicopters, and more specifically to structure providing automatic pitch control for the rotor blades operative in response to torque and to air induced blade movements.

A feature of the invention is the provision of an automatic pitch control operative to cause substantially a uniform speed of rotation of the rotor blades. This control also makes it possible to eliminate the total pitch controls in certain ships, and control of lift is accomplished through manipulation of the throttle only. In other ships, total pitch control may be used in conjunction with the automatic pitch control, which combination of elements provides additional features of convenient adjustment, and trimming of the ship for different loads.

Another feature of the invention is the provision of an improved control including a universally pivoted rotor head that can be tilted with respect to the body of the helicopter to effect directional control.

Other features and objects include the details of construction and arrangement of parts of the controls and the different mechanisms for performing desirable control functions, and will be either obvious or pointed out in the following specification and claims.

In the drawings,

Figures 9, 10 and 11 are orthographically projected views of a modification of the invention, and Figures 12 and 13 are partial plan and elevational views respectively of another modification of the invention.

Figure 1:
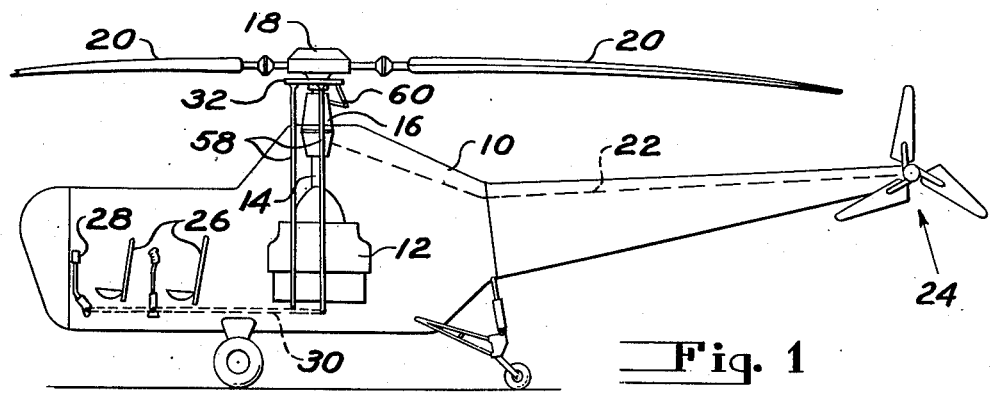
Figure 1 is a side elevational view of a helicopter including my invention.

Referring more in detail to Figure 1, the helicopter has a body 10 which supports an engine 12 for turning a drive shaft 14 connected with a reduction gear 16 which at its low speed end connects with and turns a rotor hub 18 to which blades 20 are secured by hinges to be described below. A drive shaft 22 connects to the gears within the gear box 16, at one end and at the other end connects with a drive mechanism for an auxiliary rotor 24 for counterbalancing the main rotor torque, and providing directional control. The forward part of the body 10 contains seats 26 for occupants and has azimuth controls 28 connected by links 30 with a tilt mechanism 32, to be discussed more fully below. When a control stick 28 is moved the tilt mechanism 32 will be tilted in azimuth to tilt the plane of rotation of the rotor blades 20. In the modification shown in Figures 1, 2 and 3, the rotor hub 18 is tilted, and in the other modifications of the invention, effective tilting is obtained by cyclically varying the pitch of the rotor blades, and will be discussed more fully below.

Figure 2:
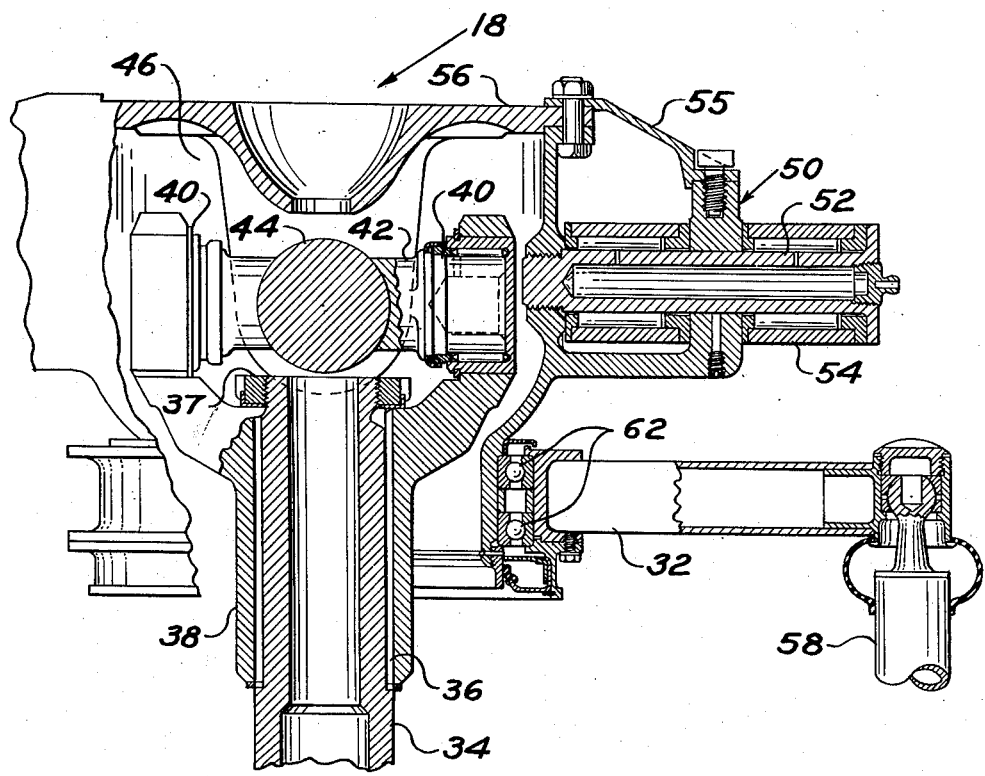
Figure 2 is a partial sectional view of a rotor head used in preferred form of the invention.

Referring now to Figure 2, a drive shaft 34 connects by splines 36 and a lock nut 37 with a yoke 38 having at its open end bearings 40. A spider 42 is journaled in the bearings 40 and has transverse arms 44, of which there are two, journaled into a housing 46 of the rotor head 18. This structure forms a universal joint which permits the hub 18 to tilt in all directions in azimuth about the shaft 34. The housing 46 is provided with brackets, only one of which is shown in detail at 50, which bracket supports a flapping pivot 52, securing bifurcated flapping links 54 which mount the rotor blade 20. To further strengthen the bracket 50, a plate 55 may be provided and secured to the upper end of the bracket 50 and a cover plate 56 for the hub 18.

The hub 18 may be tilted around the universal joint by means of a pair of control rods 58 spaced 90° apart which connect the links 30 with the tilt plate 32. The plate 32 may be held against rotation by a scissors 60 connected between the plate 32 and the gear box 16, Figure 1. The plate 32 is rotatably connected with the hub housing 46 by bearings 62. When either of the rods 58 is moved up or down, the hub 18 is tilted around the universal joint and the other rod 58 and the plane of rotation of the rotor blades 20 will be tilted accordingly. Thus effective cyclic pitch control will be afforded for the rotor blades to provide directional control for the helicopter.

Figure 3:
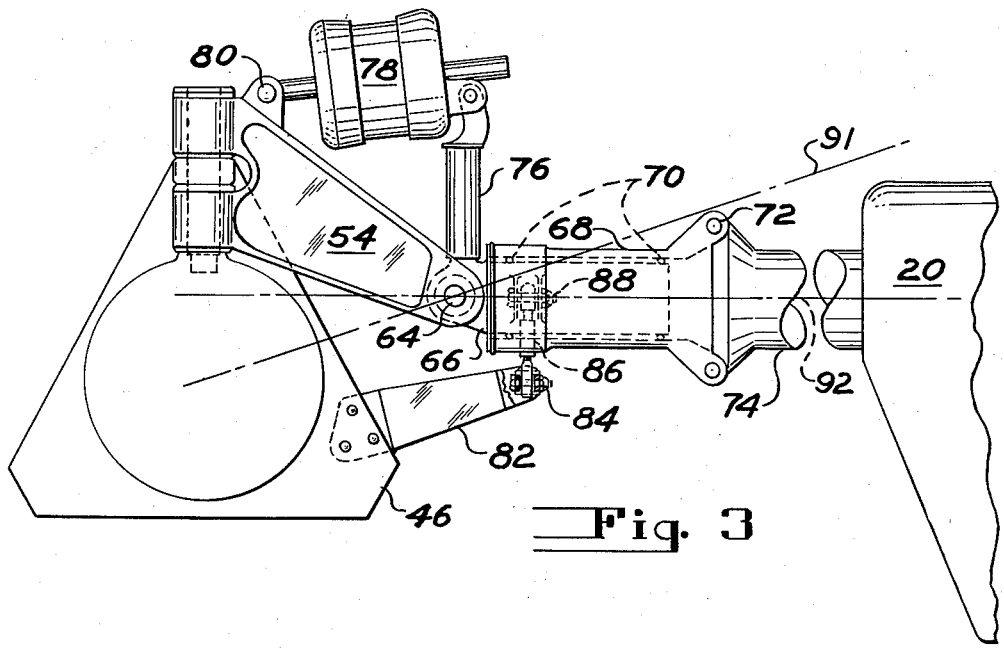
Figure 3 is a partial plan view of that form of the invention shown in Figure 2.

The flapping link 54, Figure 3, is provided at its outermost end with a drag pivot 64 which mounts a stub spar 66 to which a sleeve 68 is journaled upon thrust bearings 70. The sleeve 68 is connected as by pins 72 to a spar 74 for the blade 20. The stub spar has an angularly disposed arm 76 that is pivoted at its outer end with a damper 78, which is in turn pivoted on a pin 80 at its other end to ears on the flapping link 54.

A bracket 82 is secured at one end to the hub housing 46 and at its other end mounts a universal pin 84. The pin 84 connects with an adjustable link 86, which at the other end connects by a universal pin 88 with a depending pitch control arm 90 secured to the sleeve 68. As the sleeve 68 moves back and forth relative to the pin 84 about drag pivot 64, the arm 90 will be rocked to cause the pitch of the blade 20 to be changed.

When the rotor blade 20 of Fig. 3 is rotated forward about drag pivot 64 by aerodynamic action only, in other words in autorotation, the center line, or feathering axis, of the spar 74 and blade 20 will lie substantially along a line 91 intersecting the center of the hub 18, and the drag pivot 64. When power is applied to the rotor blade 20 from the shaft 34 turned by the engine 12, the blade will be dragged backwardly until the aerodynamic and torque forces are substantially balanced by the centrifugal force. At such time, the center line, or feathering axis, of the spar 74 and the blade will be along a line 92 at some position, in the direction of rotation of the blade, behind line 91.

Figure 4:
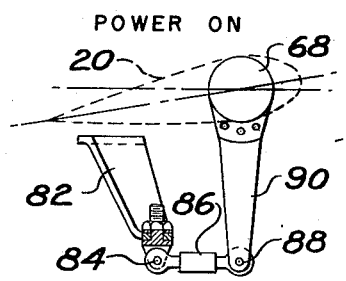
Figures 4, 5, 6, 7 and 8 are diagrammatic views of the preferred form of the invention at different phases of operation.
Figure 5:
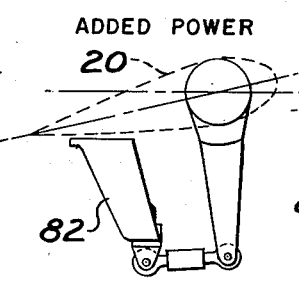
Figure 6:
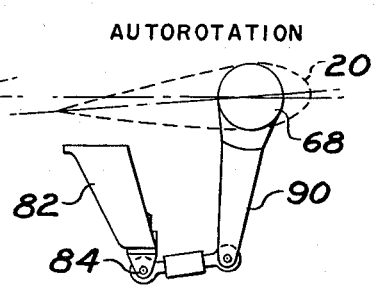

Upon dragging backward of the blade, the sleeve 68 will move toward the pin 84, and the depending arm 90 will rock around the pin 88 to cause the angle of incidence of the blade to increase. As shown in Figure 4, when power is applied to the blade 20, the blade will drag backwardly to cause a pitch increase. Figure 5 shows the further increase in pitch of the blade upon the addition of power. When power is not applied to the blade it will move forwardly in its path of rotation in the manner described above, and the sleeve 68 will move away from the pin 84 to rock the arm 90 in a clockwise direction to decrease the pitch of the blade 20. This condition is illustrated in Figure 6.

Figures 7, 8:
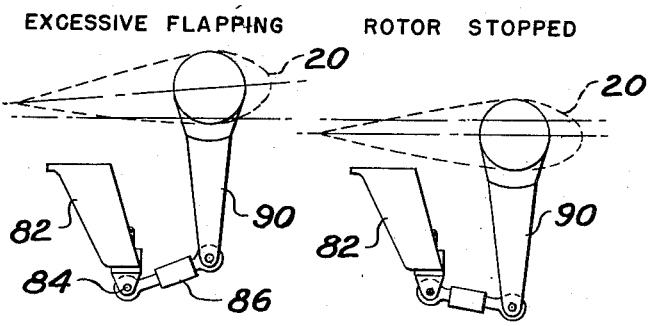

The linkage discussed above may also provide for aerodynamic damping of flapping motion. As the blade 20 flaps upwardly beyond a predetermined maximum degree, it is desirable that the lift of the blade be decreased so that it will return to its position in track with the other blades. As best shown in Figure 7, as the blade 20 flaps upwardly as it would upon encountering an upward gust of air, for example, the link 86 will rock about the pin 84 in a direction to cause the depending arm 90 to rotate in a clockwise direction. Such rotation will cause the pitch of the blade to be decreased. Conversely, when the blade flaps downwardly the pitch of the blade will be increased. It is to be noted that the link 86 can be adjusted to move the pivot points 84 and 88 with respect to each other. This will cause the arc traversed by the pivot point 88 to become more or less flattened to vary the degree of flapping at which automatic damping will become effective. Accordingly, with the use of the linkage, it is possible to obtain both automatic pitch control and aerodynamic damping of flapping to substantially any practicable degree.

Figure 8 shows the position of the rotor when it is stopped. It is to be noted that the blade has substantially zero pitch so that upon setting the rotor into operation the engine will be loaded at only a minimum, and the rotor will not cone upwardly excessively.

Referring now to Figures 9, 10 and 11, a rotor blade 100 is connected by a flapping link 102 with a hub 104 turned by an engine, not shown. The blade can drag backwardly around a drag pivot 106, and flap up and down around a flapping pivot 108. Control mechanism diagrammatically indicated at 110 comprises a non-rotating tilt plate 112, a rotating tilt plate 114 journaled thereon, a ball joint sleeve 116 upon which the plates 112 and 114 may be tilted cyclically, pitch rod controls 118, push-pull rod 120, a bell crank 122 mounted in a bracket 124 secured to a drive pivot 126 on the hub 104, a rockable link 128, and a depending arm 130 secured to a rotatable sleeve 132 for the blade 100.

The operation of the link 128, the depending arm 130, and the sleeve 132 is substantially identical to that explained above in connection with the first modification of the invention. As power is applied to the blade 100, it will drag backwardly to increase its pitch. As the blade flaps upwardly in its operation its pitch will be decreased. Accordingly, the automatic total pitch control and aerodynamic damping may be identical to that discussed above.

In addition to the automatic pitch control, for the purpose of providing for trimming of the craft and to render it possible to operate more economically when flying at different altitudes or with different loads, or both, I employ total pitch control in the control mechanism 110. As the sleeve 116 is moved up and down by the action simultaneously of the rods 118, of which there may be three, the link 120 will be moved up and down to rock the bell crank 122 to, in turn, rock the depending arm 130 to change the pitch of the blade 100. For further details of construction of a device for controlling total pitch in such manner, reference may be had to Patent No. 2,529,635, issued November 14, 1950, to I. I. Sikorsky et al.

In the modification shown in Figures 9, 10 and 11, cyclic pitch is used with universally mounted blades only, rather than with a universally mounted head in combination with universally mounted blades. The details of such blade mounts are set forth in the above mentioned application, in which the blades change in pitch a complete cycle in each revolution of the rotor. When the control rods 118 are moved differentially, the tilt plates 112 and 114 are tilted with respect to the drive shaft 126. Accordingly, the push-pull rod or link 120 will be raised and lowered once in each revolution. Raising and lowering of the rod 120 will cause the bell crank 122 to rock cyclically and the pitch of the blades 100 will be changed cyclically accordingly. Hence it is seen that I have provided a modified structure including automatic pitch change in response to torque and aerodynamic force in combination with cyclic control, and having total pitch control for trimming purposes.

Figures 12 and 13 disclose a modified arrangement of linkage similar in operation to the modifications discussed above, but in this last modification the push-pull link is used to afford aerodynamic damping upon flapping of the rotor blades, and the control mounted upon the flapping link are used, which controls may be similar in many respects to the controls disclosed in the application mentioned above.

A control mechanism 210 comprises a non-rotatable tilt plate 212 and a rotatable tilt plate 214 that turns with a drive shaft 226, and control rods 218 which may be operated simultaneously to raise or lower a ball sleeve 216 and the plates 212 and 214. The control rods 218 may be operated differentially to tilt the control mechanism 210 for obtaining cyclic pitch of a blade 200. A push-pull rod or link 220 is off-set from the axis of a flapping link 208 so that when the blade flaps upward the link 220 will cause the pitch control mechanism to decrease the pitch of the blade.

The link 220 connects with a rocker arm 230 which turns a shaft 232 journaled at one end in a bracket 234 and at its other end to a bracket 236 carried by a blade spar 238. The shaft 232 contains a universal joint 240 in alignment with a drag pivot 242 so that as the blade 200 rotates along the drag pivot 242, the shaft 232 will not be stressed. The shaft 232 in turn rocks an arm 243 connected by a link 244 to a lever 246 fulcrumed on a bracket 248 mounted upon the flapping link 202. The lever 246 connects by an adjustable link 250 with a depending arm 252 which is connected with the spar 238 for changing the pitch of the blade 200.

Automatic pitch control in response to torque and aerodynamic forces is obtained in this modification as follows:

When torque is applied to the blade 200, the spar 238 will drag backwardly. Such motion will cause movement of the spar 238 toward the bracket 248. This in turn will cause the link 244 to move to the left to rock the lever 246 in a counterclockwise direction to cause the depending arm 252 to rotate in a counterclockwise direction to increase the pitch of the blade. The movement of the blade will also cause additional rocking about the link 250 so that this modification may be made extremely sensitive to small motions, if desired. It is to be understood that any suitable proportions for the link and lever in this modification may be selected to obtain the most desirable function, and that by changing these proportions a large variation in effects is possible.

While I have shown and discussed in detail three forms of my invention, it will be understood that other modifications thereof may occur to those skilled in the art and that my invention is not limited to those forms shown and described but only by the scope of the following claims.

I claim:

1. In a helicopter, an upright drive shaft, a rotor hub universally mounted on said shaft, a rotor blade mounted on said hub for pitch changing movement having hinged connections with said hub permitting flapping and drag movements of said blade, control means for tilting said hub for directional control of the helicopter, and linkage means for effecting increase in the pitch of said blade as a result of lagging movement of the latter including a blade horn rigidly mounted on and depending from said blade, a bracket rigidly mounted on said hub, and a connecting link between said bracket and horn having pivotal connections at its opposite ends with said rigid bracket and horn respectively.

2. In a helicopter, an upright drive shaft, a rotor hub universally mounted on said shaft, a rotor blade mounted on said hub for pitch changing movement having hinged connections with said hub permitting flapping and drag movements of said blade, control means for tilting said hub for directional control of the helicopter, and linkage means for effecting decrease in the pitch of said blade as a result of flapping movement of the latter including a rigid blade horn depending from said blade, a bracket rigidly mounted on and extending outboard from said hub alongside said blade, and a link pivotally connected at one of its ends to said rigid bracket and at its other end to said rigid blade horn.

3. In a helicopter, an upright drive shaft, a rotor hub mounted on said drive shaft for universal movement about the axis of said shaft, a flapping link having a generally horizontal hinged connection with said hub, a blade root shaft having a generally vertical hinged connection with said link, a blade mounted on said root shaft for pitch changing movements about the latter, and linkage means for effecting increase in the pitch of said blade upon upward flapping and decreasing the pitch thereof upon movement of said blade backward about said generally vertical hinge as a result of increased torque applied to said drive shaft, said means including an axially offset blade horn rigidly carried by and depending from the cuff of said blade, an arm rigidly mounted on and extended outboard from said hub and terminating adjacent the free end of said horn, and a link pivotally connecting the free ends of said rigidly mounted arm and horn.

4. In a helicopter, an upright drive shaft, a rotor hub mounted on said drive shaft, a flapping link having a generally horizontal hinged connection with said hub the axis of which intersects the axis of said drive shaft, a blade root shaft having a generally vertical hinged connection with said link at the outboard end of the latter, a blade having a cuff pivotally mounted on said root shaft for pitch changing movements about the latter, and linkage means for effecting increase in the pitch of said blade upon upward flapping and decreasing the pitch thereof upon movement of said blade backward about said generally vertical hinge as a result of increased torque applied to said drive shaft, said means including an axially offset blade horn rigidly mounted on and depending from said cuff, a bracket rigidly mounted on said hub and extended outboard therefrom and terminating adjacent the free end of said horn, and a link pivotally connected at its opposite ends respectively with the free ends of said rigidly mounted bracket and said rigidly mounted horn.

WILLIAM E. HUNT.

REFERENCES CITED

The following references are of record in the file of this patent:

UNITED STATES PATENTS

| Number | Name | Date |
|---|---|---|
| 1,919,089 | Breguet | July 18, 1933 |
| 1,927,966 | Vaughn | Sept. 26, 1933 |
| 1,986,709 | Breguet | Jan. 1, 1935 |
| 2,074,342 | Platt | Mar. 23, 1937 |
| 2,397,154 | Platt | Mar. 26, 1946 |
| 2,397,489 | Jenkins | Apr. 2, 1946 |
| 2,410,459 | Platt | Nov. 5, 1946 |
| 2,432,677 | Platt | Dec. 16, 1947 |
| 2,440,225 | Pullin | Apr. 20, 1948 |